Figure 1:
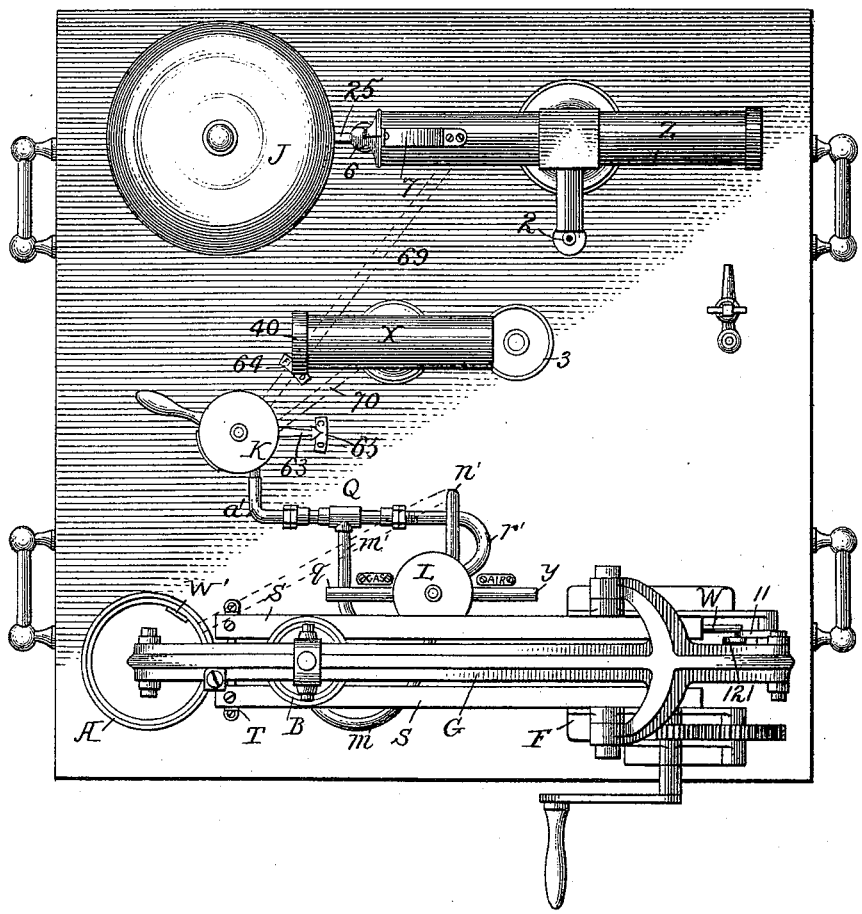

(No Model.) 4 Sheets—Sheet 1.

T. SHAW.
APPARATUS FOR TESTING MINE GASES.

No. 460,683. Patented Oct. 6, 1891.

WITNESSES
Jno. G. Hinkel
A. E. Fansmann.

INVENTOR
Thomas Shaw M.E.
By Inter & Freeman
Attorneys.

(No Model.) 4 Sheets—Sheet 2.
T. SHAW.
APPARATUS FOR TESTING MINE GASES.
No. 460,683. Patented Oct. 6, 1891.
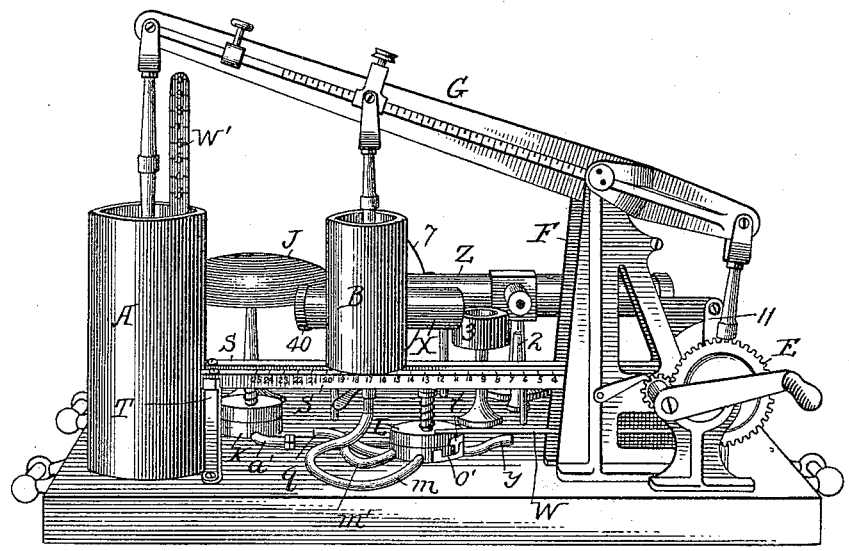
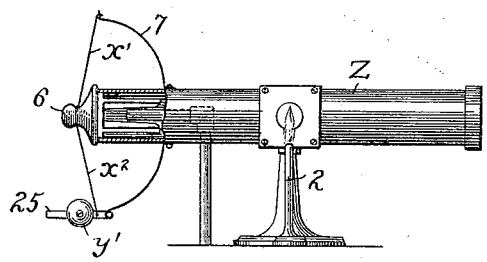
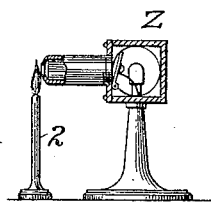
WITNESSES
INVENTOR
Thomas Shaw M.E.
By Porter & Freeman
Attorneys.

(No Model.) 4 Sheets—Sheet 3.
T. SHAW.
APPARATUS FOR TESTING MINE GASES.
No. 460,683. Patented Oct. 6, 1891.
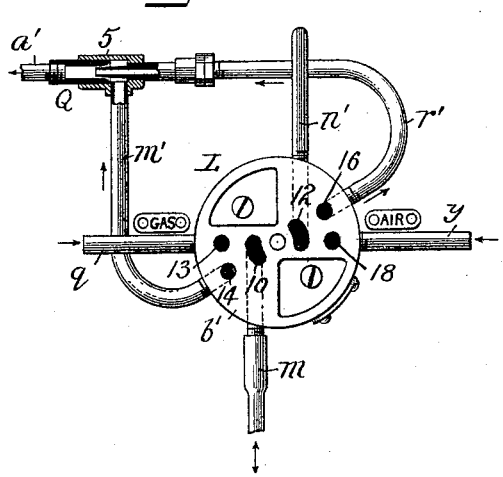
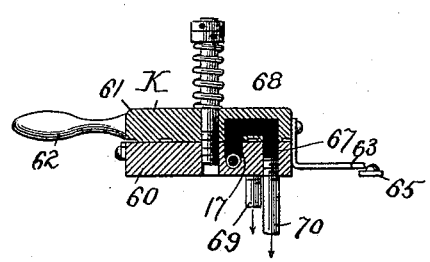
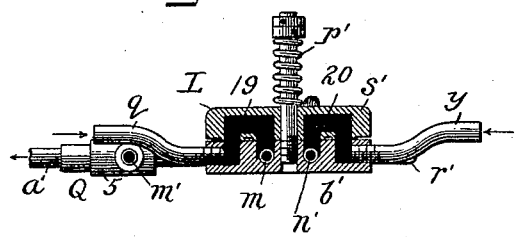
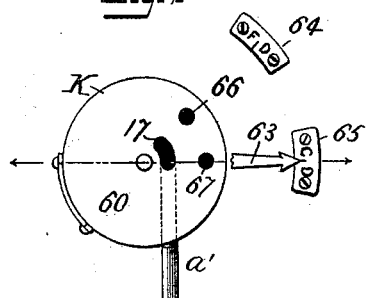
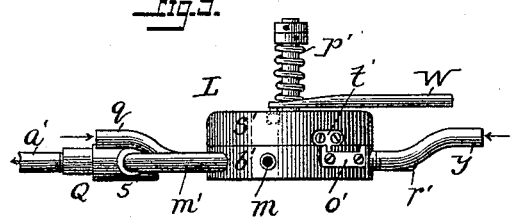
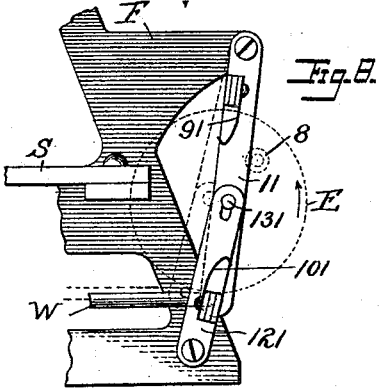
WITNESSES
Jno. G. Hinkel
A. E. Hansmann
INVENTOR
Thomas Shaw M.E.
By Trite & Freeman
Attorneys (No Model.) 4 Sheets—Sheet 4.
T. SHAW.
APPARATUS FOR TESTING MINE GASES.
No. 460,683. Patented Oct. 6, 1891.
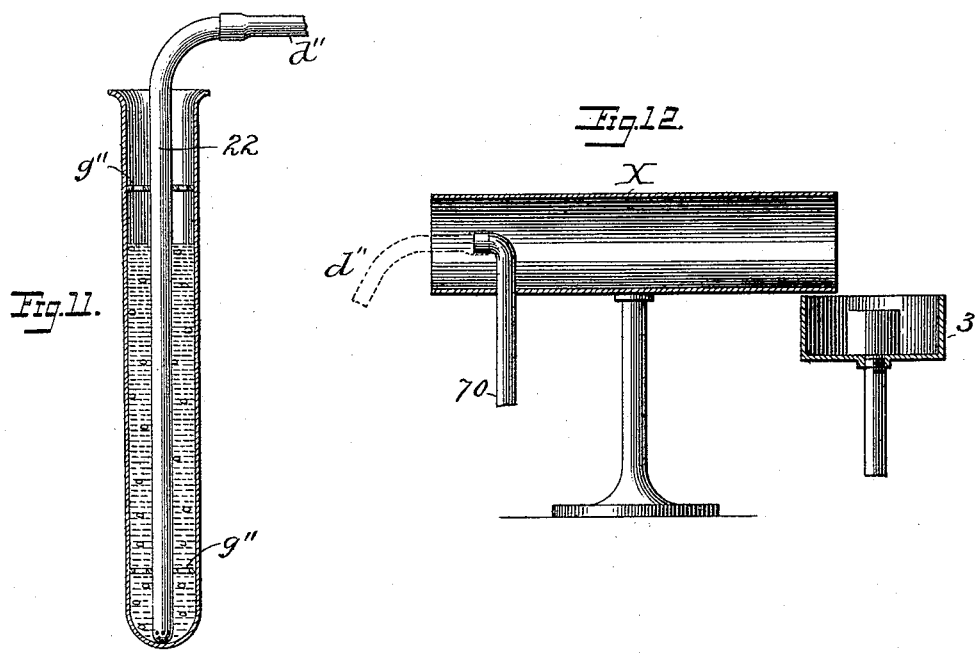
WITNESSES
Jno. G. Hinkel
A. E. Hansmann.
INVENTOR
Thomas Shaw M.E.
By Inter & Freeman
Attorneys.

UNITED STATES PATENT OFFICE.

THOMAS SHAW, OF PHILADELPHIA, PENNSYLVANIA.

APPARATUS FOR TESTING MINE-GASES.

SPECIFICATION forming part of Letters Patent No. 460,683, dated October 6, 1891.

Application filed January 21, 1891. Serial No. 378,587. (No model.)

*To all whom it may concern:*

Be it known that I, THOMAS SHAW, a citizen of the United States, residing in Philadelphia, State of Pennsylvania, have invented certain new and useful Improvements in Apparatus for Testing Mine-Gases, of which the following is a specification.

My invention relates to that class of apparatus for testing mine-gases set forth in Letters Patent Nos. 394,214 and 394,215, heretofore granted to me; and my invention consists in certain improvements in apparatus of said character, as fully set forth hereinafter, and as illustrated in the accompanying drawings, in which—

Figure 1 is a plan view of the apparatus; Fig. 2, a perspective elevation; Figs. 3 to 7, views illustrating the construction of the valves and mixer; Fig. 8, a detached view illustrating the devices for vibrating the valve-cap; Fig. 9, a side view in part section, of the tester; Fig. 10, an end view of the tester; Fig. 11, a view illustrating the tester for choke-damp; Fig. 12, a sectional view of the test-instrument X; Fig. 13, a view illustrating the mode of collecting small quantities of mine gases.

The improved apparatus consists of a base supporting an air-pump cylinder A, a standard F, upon which is mounted a walking-beam G, a standard T, which, in connection with the standard F, supports graduated rails or ways S, upon which slide the gas-pumping cylinder B, having its piston adjustably connected with the walking-beam and the valve devices K L, operating, as hereinafter set forth, to secure various mixtures of various gases to be tested. Upon the base-plate is also mounted a gas-tester Z for receiving charges of gases ignited by a burner through a nozzle 2, and acting upon a piston and hammer 6, and causing the latter to strike a gong or alarm J, as set forth in my patent, No. 394,214. There is further mounted upon the base-plate a cylinder X, uncovered at one end and communicating at the other with a pipe for supplying the mixture to be tested, with a burner 3 opposite the open end, as set forth in Letters Patent granted to me, No. 394,215.

It will not be necessary here to fully set forth the details of working of the parts described in the aforesaid Letters Patent, and I will therefore refer only to those features embodying my additional improvements.

Instead of employing the valves constructed as set forth in Letters Patent No. 394,214, I make the valves as best illustrated in Figs. 3 to 7. The valve L (shown in detail in Figs. 3, 4, and 5) consists of two portions, the base $b'$ and the cap $s'$. In the base are six ports, the ports 10 12, which are upon opposite sides of and near the center and somewhat elongated, communicating, respectively, with the tubes $m$ $n'$, the former leading to the gas-pump B and the latter to the air-pump A. Beyond or outside of the opening 10 are two ports 13 14, the former leading to the gas-pipe $q$, which conveys gas of a known or standard quality, and the latter communicating with the pipes $m'$, that communicate with the external casing 5 of an injector-mixer Q, with the inner nozzle of which communicates a pipe $r'$, leading to one of the outer ports 16, whereby the gas expelled through the tube $m'$ is thoroughly mixed with the air which flows through the tube $r'$ and both communicated through the tube $a'$ with the inner port 17 of the hand-valve device K. The sixth port 18 communicates with a pipe $y$, admitting air.

The cap $s'$ has two ports or channels 19 20, the former serving to put the port 10 in communication with either the port 13 or the port 14, according as the cap is adjusted, while the latter puts the port 12 in communication with the port 16 or the port 18, according as the cap is adjusted; and a spring $p'$ serves to press the cap upon the base of the lower section, and the shifting of the upper section (limited by a gage $o'$ of the lower and a finger $t'$ of the upper section) determines the line of flow of the various gases or mixtures in carrying out the operations set forth in the aforesaid Patent No. 394,214, the above-described valve devices L taking the place of the valve devices M described in said patent.

The cap-section $s'$ of the valve is vibrated by the mechanism specially shown in Figs. 1, 2, and 8 through the medium of a connecting-rod W. This is connected by a screw-pivot with the lower end of a lever 11, hung below a projection on the bracket F and centrally connected by a slot and pin 131 with a lever 121, pivoted at its lower end to the bracket F, and each lever carries a flat spring-bearing 91 and 101, respectively, in position to be alternately struck by a crank-pin 8 upon a disk E as the latter is revolved, so that a vibration in one direction is imparted by contact of the crank-pin with the spring-bearing of one lever and in the opposite direction by contact with the spring-bearing of the other lever.

The mixed gases from the valve device L and the mixer Q are delivered to the valve device K through the pipe $a'$. This valve device consists of a base 60 and the movable cap 61, which is provided with a handle 62, by which it is partially rotated, and a pointer 63, which is arranged to be moved over the plates 64 and 65 and thereby indicate the position of the ports and passage-ways within the valve. The base 60 is provided with the three ports 17, 66, and 67, with the former of which joins the pipe $a'$ from the mixer Q and with the latter two the pipes 69 and 70, leading, respectively, to the testers Z and X, as shown in Fig. 1. In the cap 61 of the valve device K is arranged the channel 68, which is adapted to put in communication the port 17, which is elongated somewhat with either of the ports 66 or 67, according as the cap is adjusted, so that the mixed gases may be delivered to either tester Z or X, as preferred.

The ways S for supporting the adjustable cylinder B are graduated in accordance with the corresponding graduations upon the walking-beam G, so as to accordingly adjust the cylinder in proper position in respect to the pitman connections; and a bar W' is connected to the piston of the cylinder A and is graduated in divisions of tenths of the whole stroke, whereby to indicate the extent of movements of the piston.

A test-tube, Fig. 11, contains a metal tube 22, perforated at the bottom end and carrying perforated centering-disks $g''$, and the tube 22 communicates through a flexible tube $d''$ with the tube 70 of the tester X, Fig. 12, the cap 40 of the tester being removed to permit the tube $d''$ to be connected with the pipes 70. When the test is to be made for choke-damp— a carbonic-acid gas ($CO_2$)—a fluid-ounce of transparent lime-water is placed in the test-tube. The communication is made, as described, between the tubes 22 and 70 and the valve devices K and L, and the pipe leading from the mine is connected to communicate with the tube $y$, Fig. 1. The cylinder B is brought beneath the fulcrum of the walking-beam, so as to be quiescent, and the beam is vibrated to fill the cylinder A with the gas or air to be tested. When the contents of the cylinder are wholly expelled on the down-stroke, the air or gas bubbles up through the liquid in the air or test tube and by the extent to which the latter is rendered translucid or opaque indicates readily to an experienced observer the amount of choke-damp mixed with the air. The standard of comparison in these tests is fixed by mixing one per cent. of carbonic-acid gas with pure air in a bag and noting the color produced by forcing this mixture through the lime-water by a single expulsion from the cylinder A, and thereafter when any subsequent test of an unknown mixture is made the operator notes the point in the descent of the plunger A at which the test-color is noticed. Thus if the test-color is evident when the plunger has progressed to one-tenth of its stroke there is evidence of the presence of ten per cent. of carbonic-acid gas in the air—that is, a dangerous amount—while if the plunger progresses one-half of its stroke or more before the color-line is reached it will be evident that two per cent. or less of carbonic-acid gas is present in the air. The same rule applies to all proportions of the stroke and to the double stroke. This same character of test is made when both choke-damp and fire-damp are present at the same time, and neither of the gases interferes with the other in giving their characteristic tests. Mixed gases are tested, therefore, for the purpose of determining the percentage of light carbureted hydrogen and then for carbonic acid, and by means of the described apparatus both tests can be made in a few moments and accurately determined by common workmen unskilled in chemistry with a precision of results that could not be excelled by ordinary chemical tests of the most exact character.

Instead of the connections between the bow-springs 7 of the tester Z, Fig. 9, illustrated in Patent No. 394,214, I connect one arm of the spring by a wire thread $x'$ with the plunger 6, and a wire $x^2$ connects the plunger with a lever 25, having an adjustable weight $y'$ and joined at its end to the end of the lower branch of the bow-spring. By this construction I can adjust the weight $y'$ so as to regulate the normal tension that draws in the plunger to any desired extent.

In Fig. 13 I have illustrated the mode of collecting gases in the mine when, for example, it is desired to test the gas for a plain carbureted-hydrogen gas. This is done by means of a flexible hand-pump P', which may be compressed and expanded by the hands, which receives the gas through a tube 35, that may be closed at the desired point to collect the gas and deliver the latter into a gas-bag 26, which when full may be detached and corked up and thereafter connected with the inlet of the tube of the above-described apparatus for testing. This may be used to collect the gas at points where the mine is not piped.

The above-described apparatus may be used in various ways for testing various fluids and mixtures to determine their proportions mechanically with an accuracy which cannot be excelled by the most careful manipulations of chemical experts employing ordinary modes.

Without limiting myself to the precise construction and arrangement of parts shown, I claim—

1. The combination, with the standards, walking-beam, and cylinder A, having a piston connected to said beam, of the adjustable cylinder B, having its piston adjustably connected with the walking-beam, the beam and the support for the cylinder B being relatively graduated, substantially as set forth.

2. The combination, with the walking-beam and cylinder A, having its piston connected with said beam, of a graduated plate W', connected with the piston of the cylinder A, a holder adapted to receive a liquid, and a pipe or tube connecting the pump with the said holder and into which it extends, substantially as described.

3. The combination, with the walking-beam, cylinders and pistons, and pipes $q\ y\ n'\ r'$ and $m$ and $m'$, and with the mixer Q, of a valve device consisting of a base $b'$, having ports 10 12 13 14 16 18, and a cap-piece having ports 19 20, substantially as described.

4. In an apparatus for testing for carbonic-acid gas, the combination, with the pump-cylinder A and discharge-tube connected thereto, of a tube $d''$, test-tube 11, containing a testing-fluid, and tube 22, all substantially as set forth.

5. The combination, with the tester-plunger 6, of the spring 7, and lever 25, carrying an adjustable weight $y'$ and connected to the springs and by a cord to the plunger, substantially as set forth.

6. The combination, with the valve-cap, of the levers 11 101, pivoted at their ends and having a sliding connection, one of the levers connected with the cap, and a revolving shaft carrying a crank-pin in position to make contact with spring-bearings of both levers, substantially as set forth.

In testimony whereof I have signed my name to this specification in the presence of two subscribing witnesses.

THOMAS SHAW.

Witnesses:
JOSEPH R. WILSON,
L. SHUGARD.